United States Patent [19]

Gamble

[11] 4,388,841

[45] Jun. 21, 1983

[54] LOAD BALANCING DEVICE

[76] Inventor: Christopher L. Gamble, 2040 E. Howe, Tempe, Ariz. 85281

[21] Appl. No.: 153,166

[22] Filed: May 27, 1980

[51] Int. Cl.³ .............................................. F16F 15/22
[52] U.S. Cl. .................................... 74/573 F; 24/369; 301/5 BA
[58] Field of Search ......................... 74/573 F, 573 R; 301/5 B, 5 BA; 24/369, 370, 373, 376

[56] References Cited

U.S. PATENT DOCUMENTS

| | | | |
|---|---|---|---|
| 1,896,974 | 2/1933 | Sailler | 301/5 B |
| 3,063,754 | 11/1962 | Pierce | 301/5 BA |
| 3,077,914 | 2/1963 | Fritts | 301/5 BA |
| 3,166,356 | 1/1965 | Sutherland et al. | 74/573 |

*Primary Examiner*—Kenneth Dorner
*Attorney, Agent, or Firm*—Gregory J. Nelson

[57] ABSTRACT

A load balancing device for rotating apparatus such as washing machines and vehicle tires. In one embodiment the present invention consists of an inner conduit defining an interior raceway which contains a high density fluid mass which shifts to oppose load imbalances. Universal mounting brackets are provided attached to the balancing ring to the rotating structure. The attachment brackets are slidable along the ring and adjustable and adapted for securement in various arrangements. In other embodiments the attachment brackets are adapted to accomodate various wheel configurations and bolt spacings for vehicles.

2 Claims, 13 Drawing Figures

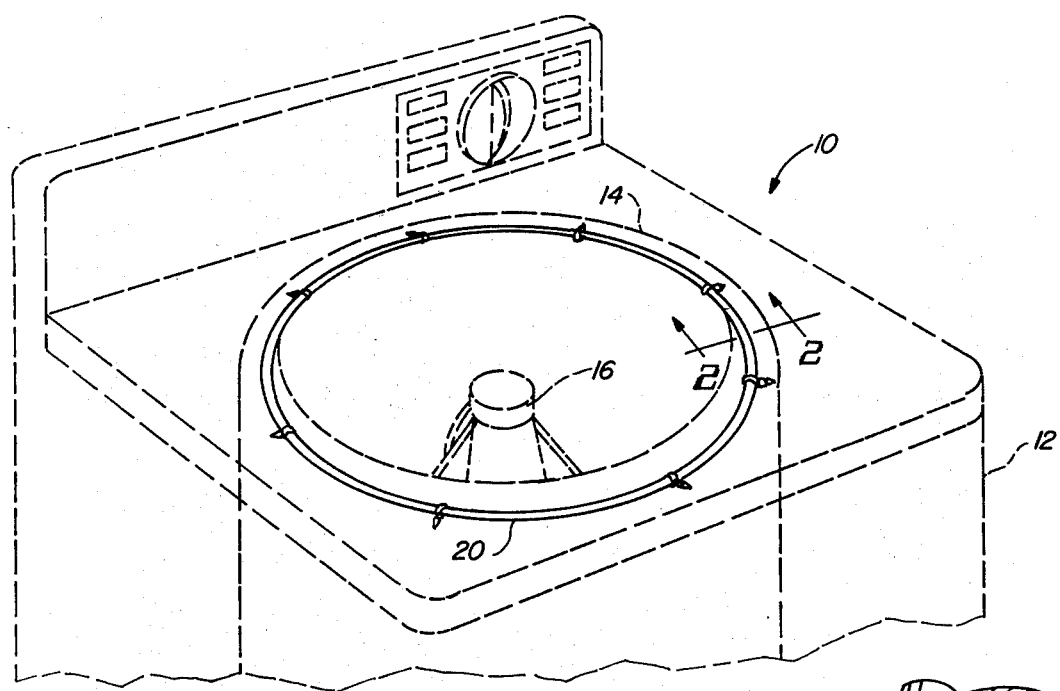
FIG-1
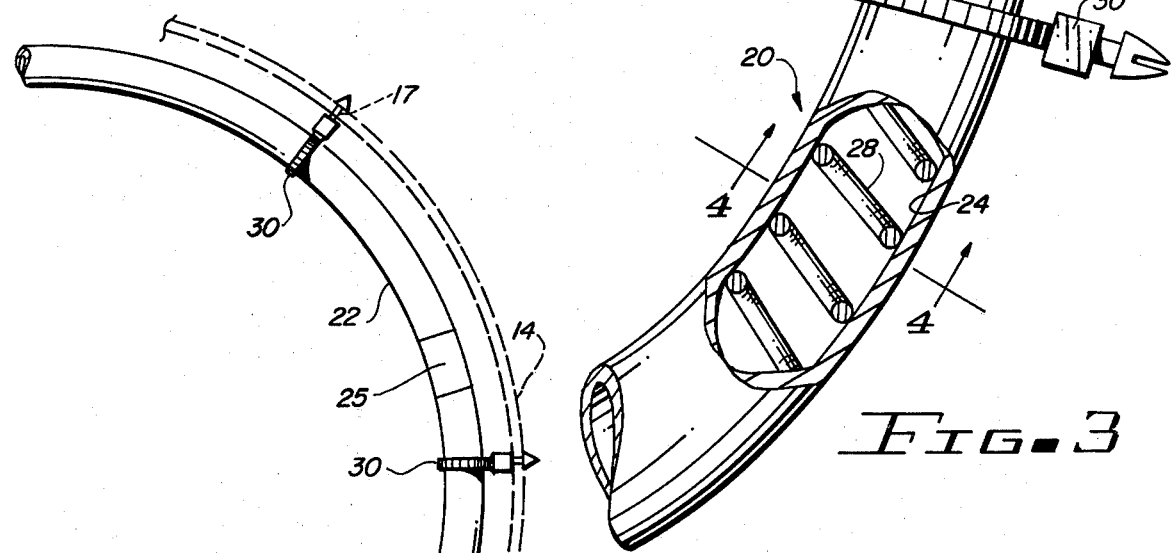
FIG-3
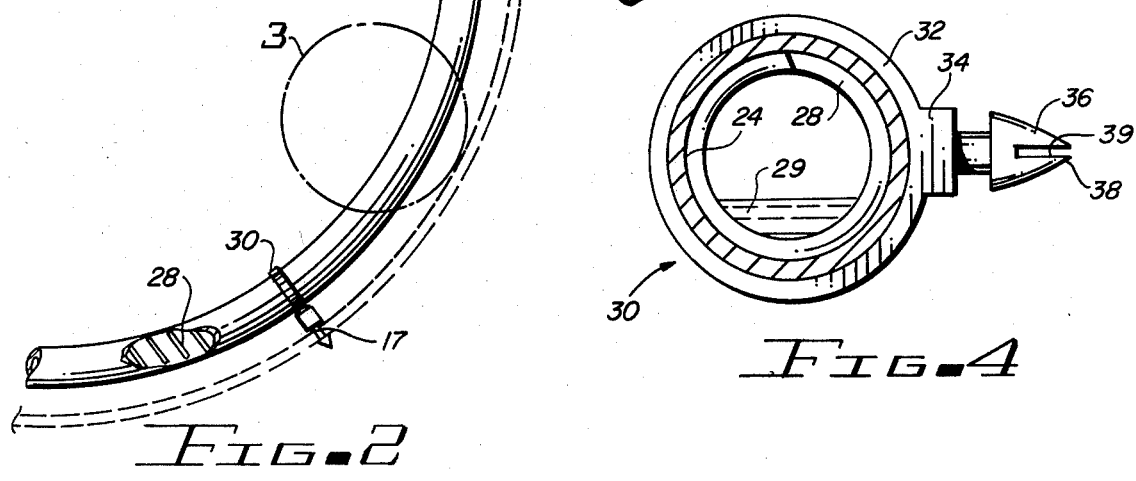
FIG-2
FIG-4

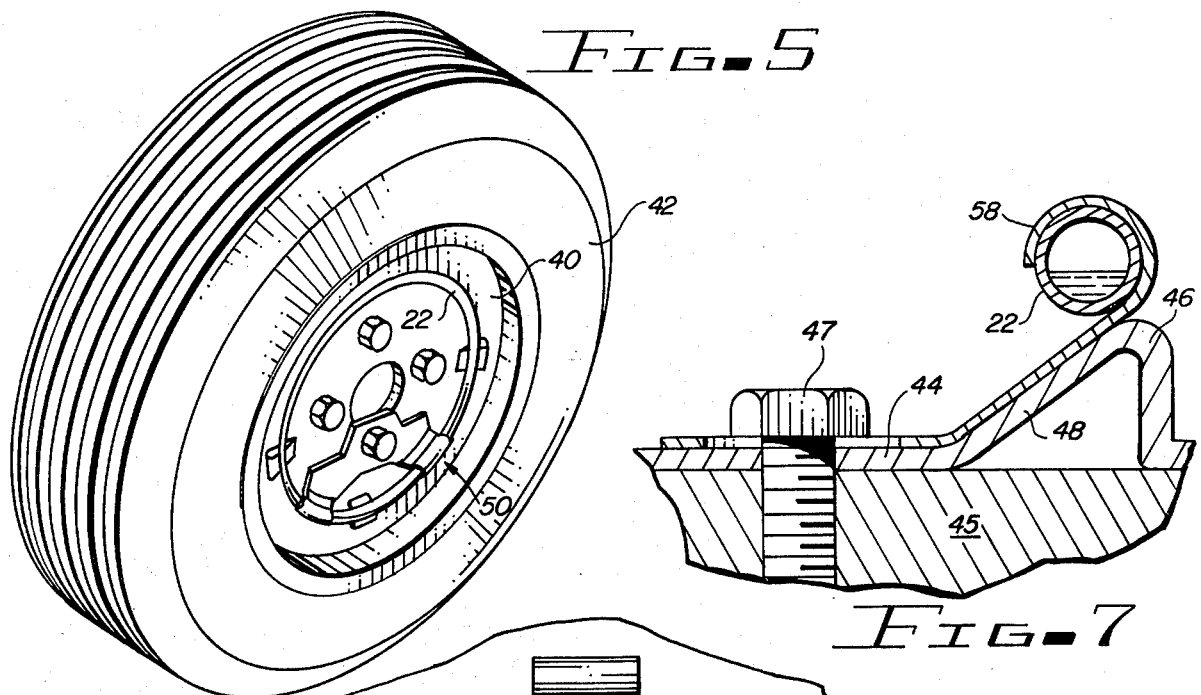
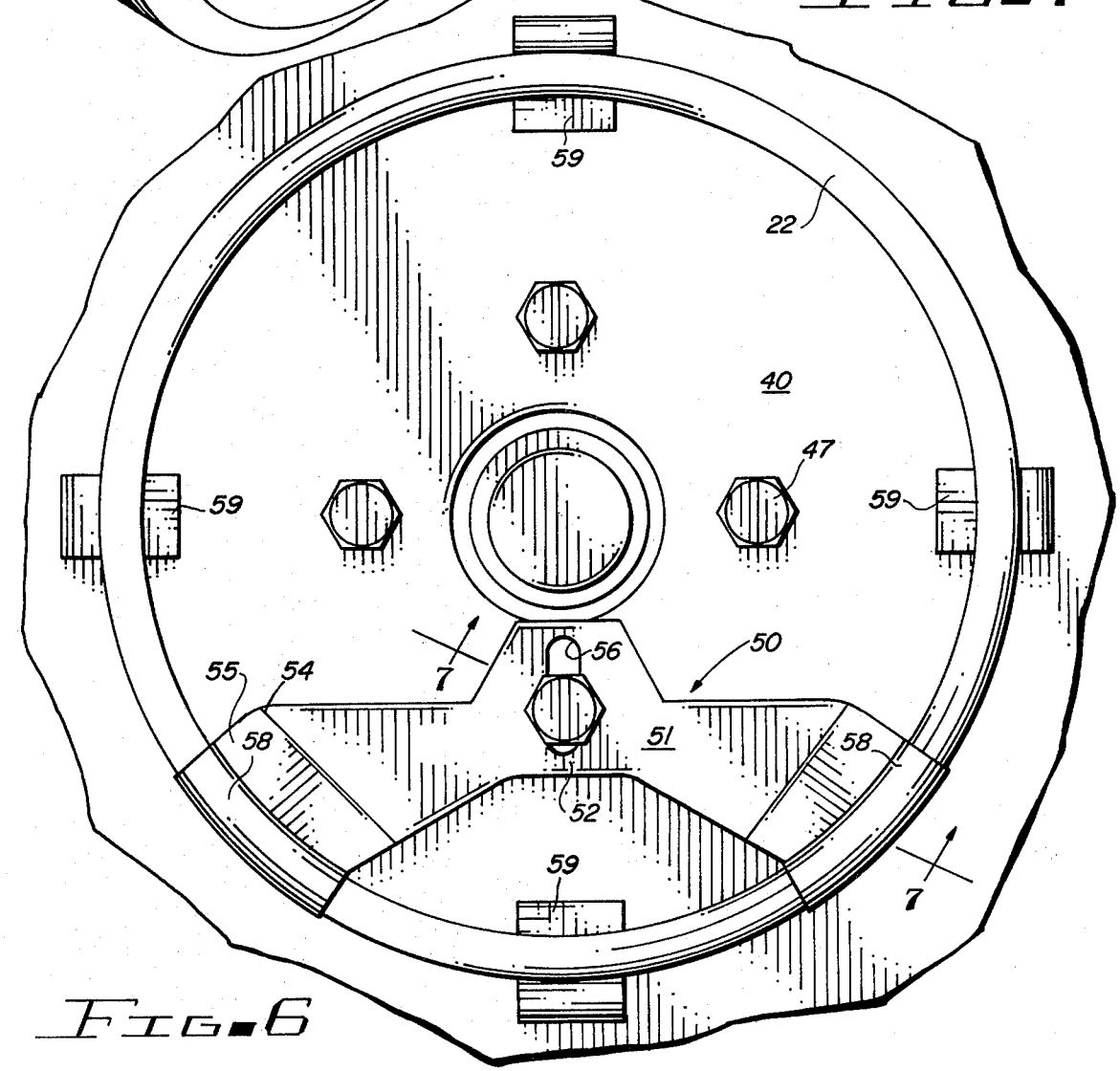

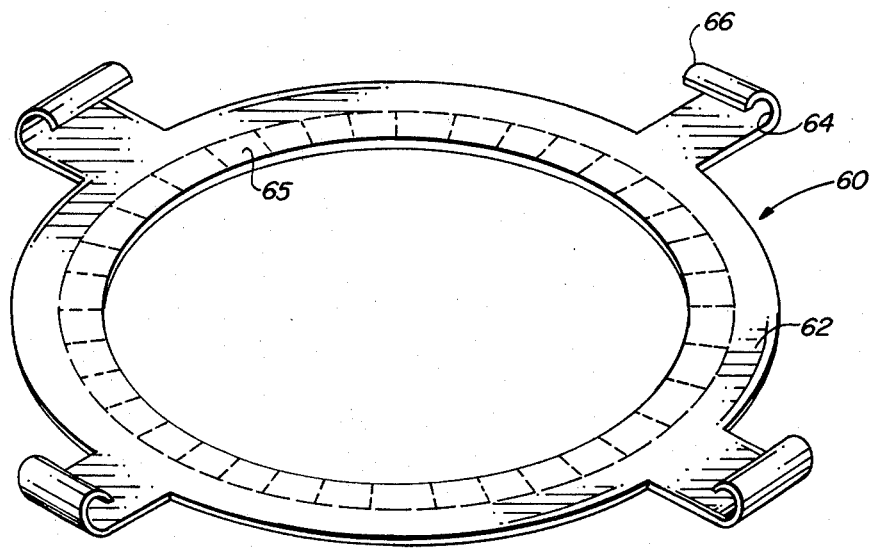
FIG. 8
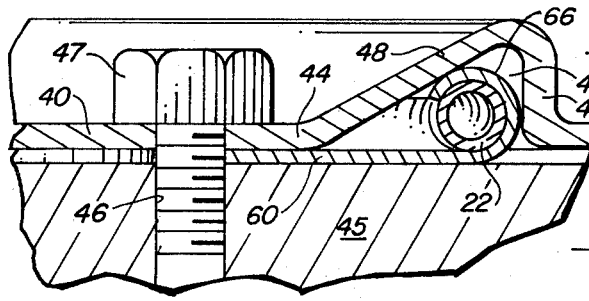
FIG. 9
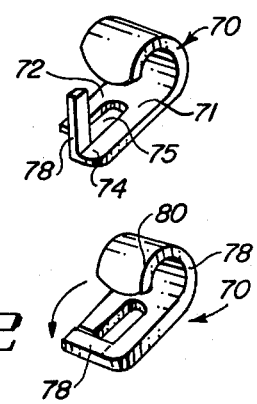
FIG. 11
FIG. 12
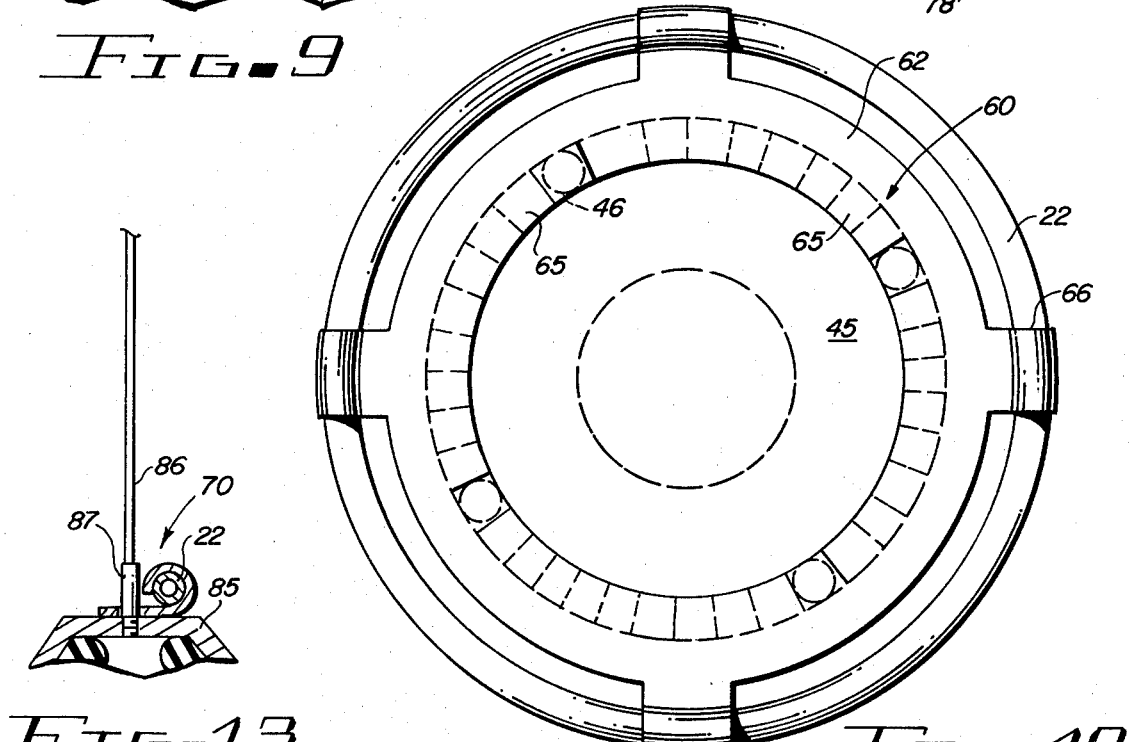
FIG. 13
FIG. 10

LOAD BALANCING DEVICE

The present invention relates to a load balancing device for rotating members and more specifically relates to a balancing device for wheels and drums in which a moveable fluid mass is disposed within a hollow flexible conduit which is securable to the rotating member at adjustable fastener brackets.

Various systems have been developed for properly balancing rotating members such as wheel and tire assemblies so the tire does not wear unevenly shortening the life and tread of the tire. One of the most commonly employed systems for balancing wheel and tire assemblies is the securement of counterbalancing lead weights to the wheel at various positions. These arrangements are not entirely satisfactory since the weights are fixed and tend to compensate only for a single condition. In the event that condition changes due to tire wear or some other cause, the balancing is no longer effective. Other systems have been developed for balancing tire and wheel arrangement which include the insertion of a plurality of mobile mass elements loosely positioned within the tire. For example, a dynamic wheel balancing system of this type is shown in U.S. Pat. No. 4,179,162 showing such a system. Other systems showing automatic rotation balancing systems for tires and wheel arrangements involve the placement of discrete mass balancing members within some type of raceway or grooveway cavity attachable to the wheel or rim. Typical of these systems are U.S. Pat. Nos. Re 25,383; 3,913,980; and 3,316,021.

The problem that arises with rotating tire wheel assemblies also is common in other rotating bodies. One of the most common is the imbalance often encountered in automatic washing machines. This problem arises because of the load distribution of clothing within the tub which shifts from one location to the other during the washing cycle. Various mounting and drive mechanisms have been devised to reduce the effects of unequal load distribution and shifting of the center of gravity due to the imbalanced load. One such load equalizer is shown in U.S. Pat. No. 3,321,997 which uses a toroidal ring placed about the outer periphery of the tub within which are mass and separator members.

Due to the foregoing and the many suggested approaches to the problem of balancing a rotating load, it becomes apparent that there is a need for an effective, universal and simplified load balancing member. Briefly, the present invention provides a load balancing member for balancing or equalizing a load rotated about a central axis. The load balancing device of the present invention comprises a hollow, flexible conduit which defines an internal raceway within which a shiftable fluid mass is contained. The hollow, flexible conduit can be secured to the rotating device at a universal fastener. In one embodiment the load balancer is specially adapted for securement to an automobile tire at a universal attachment which comprises a ring to which the conduit is secured. Knock-out members may be removed at suitable location on the ring corresponding to the bolt circle diameter of the wheel. Another embodiment is adapted for attachment to the tub of a washing machine, the adjustable or universal fastener brackets comprise expandable projections which are securable to holes or perforations in the tub. In still another embodiment of the invention, the brackets are in the form of clips which may be secured to the spokes of a rotating device such as a vehicle wheel.

The above and other objects and advantages of the present invention will become more apparent from the following description, claims and drawings in which:

FIG. 1 is a perspective view of a washing machine shown in dotted lines with the load balancing device of the present invention attached thereto;

FIG. 2 is a partial plan view of the load balancing device shown in FIG. 1;

FIG. 3 is an enlarged detailed view as indicated in FIG. 2;

FIG. 4 is a sectional view taken along lines 4—4 of FIG. 3;

FIG. 5 is perspective view of an automobile wheel and tire with the load balancing device of the present invention secured thereto;

FIG. 6 is a side elevational view of the automobile tire shown in FIG. 5;

FIG. 7 is a sectional view taken along lines 7—7 of FIG. 6;

FIG. 8 is a perspective view of an alternate form of the universal attachment bracket;

FIG. 9 is an enlarged fragmentary detailed transverse cross-sectional view showing the load balancing device and bracket of FIG. 8 attached to a vehicle wheel;

FIG. 10 is a side elevational view of the bracket of FIG. 8 showing several of the knock-out sections removed;

FIG. 11 illustrates another form of attachment bracket adapted for spoke vehicle wheels;

FIG. 12 illustrates the bracket shown in FIG. 11 in a locked position; and

FIG. 13 illustrates the bracket of FIGS. 11 and 12 secured to a wheel spoke with the load balancing tube in place.

Turning now to the drawings, and particularly FIGS. 1 through 4, the load balancing device of the present invention is shown in connection with a conventional washing machine 10 which includes a cabinet or housing 12. A rotary drum or tub 14 is positioned within the cabinet 12 and mounted within the tube 14 is an agitator 16. Generally the inner tub 14 is provided with variously positioned holes or perforations 17 about the periphery of the drum. The various components of the washing machine are more or less conventional and well-known in the art and further detail description is not believed necessary.

The load balancing device of the present invention is generally indicated by the numeral 20 and includes annular, hollow conduit 22. Preferably conduit 22 has a diameter approximately corresponding to the interior diameter of tub 14. Conduit 22 is flexible and defines an interior annulus or raceway 24. Conduit 22 can be formed from any suitable material preferably having low frictional characteristics such as material sold under the trademark "Teflon". Conduit 22 can be formed from a section of tube and joined in an annulus by a shrink-fitting member 25.

As best seen in FIG. 3, the interior passageway 24 of conduit 22 houses annularly extending spring member 28 which provides additional strength and further serves to better distribute the fluid mass balancing material within the tube. The fluid mass balancing material 29 may be any suitable fluid having a relatively high density such as mercury. For example, it has been found that as little as one-quarter pound mercury is suitable for balancing most devices such as washing machines and automobile tires.

The conduit 22 is securable in place by a plurality of adjustable, universal fasteners or brackets 30 disposed about the exterior of the conduit. The brackets are best seen in FIGS. 2 to 4 and include an outer ring 32 which is disposed about the conduit. Projection 34 has a lead 36 which extends from the ring. Head 36 is preferably conical at 38 having an axially extending slot 39. The mounting bracket 30 is fabricated of resilient material. The major diameter of head 36 is selected to be slightly greater than the diameter of the holes 20 within the drum 14. Accordingly, the conduit 22 can be positioned at the periphery of the drum by circumferentially moving fasteners 30 to a position to align with the holes 17. Brackets 30 can also be rotated with respect to the annular center line of the conduit. When the brackets are properly positioned they may be forced into holes 17. Slot 39 will allow the head 36 to compress slightly with the undercut edge 36 of the head engaging the periphery of the holes 20.

In use and operation, the balancing device is secured to the rotating tub 14 at adjustable fastener brackets 30. As the drum is rotated, fluid mass 29 tends to distribute itself at the proper locaton within the conduit. Springs 28 assist in the distribution of the balancing mass within the conduit and further strengthens the tubing. Upon the application of an unbalanced load, the high density fluid mass will, under the infleunce of central force, move to oppose the heavy load and equalize the same. Thus, the tub remains in dynamic balance and vibration is minimized.

The invention is shown applied to a vehicle tire and wheel assembly in FIGS. 5 through 7. A load balancing conduit 22 containing fluid 29 is as has been described with reference to previous figures. The conduit is shown secured to the rim 40 of a wheel, which supports a pneumatic tire 42. Rim 40 is of conventional design having a web portion 44 secured to peripheral tire holding rim section 46. The web section 44 is secured to the outer surface of a brake drum 45 by a plurality of bolts 47 arranged on a bolt circle at circumferentially spaced apertures or openings. The web is further provided with annular outwardly extending reinforcing section 48 extending outwardly of the bolt circle.

Conduit 22 is secured in place by a bracket 50 having central body section 51 and two oppositely extending arm sections 54. Central section 51 is slotted at 56 to receive bolt 47. The ends of arms 54 are formed in an acute angle at 55 with respect to section 51 to conform to reinforcing section 48 of the rim. The terminal ends of arms 54 are in a general U-shape at section 58 to at least partially encircle the outer wall of the conduit and secure it in place. Shims 59 of an appropriate absorbent resilient material are placed about the conduit between the conduit 22 and web section 44 of the tire rim. As the wheel and tire rotate, the dense fluid mass 29 within the conduit will rotate to oppose imbalanced forces as has been explained.

FIGS. 8 to 10 illustrate another form of bracket for securing the fluid mass retaining conduit in place against a tire wheel assembly which is adaptable to fit various wheel units and bolt spacings. The tire and wheel assembly is illustrated in FIG. 9 and in reference to this figure, the same or similar numerals have been used to designate similar elements. Tire rim 40 having a web 44 is again secured in place against brake drum 45 by bolts 47. Annular reinforcing section 48 defines a recess 49 between the rim and brake drum. Bracket 60 is secured in position intermediate the brake drum and rim 40, with the flexible conduit 22 positioned within the annular recess 49.

Bracket 60 is best shown in FIGS. 8 to 10 and comprises an annular ring section 62 having a plurality of radially extending tabs 64. Tabs 64 terminate at ends 66 which are reversely bent to partly encircle the conduit 22 as best seen in FIG. 9. Annular ring 60 is provided with a plurality of knock-out removable sections 65 spaced around the interior of the ring. The weakened section 65 can be broken away at perforations or lines 67 with a suitable tool at locations corresponding to the bolt hole positions 46 on the wheel. This is best illustrated in FIG. 10. Bracket 60 can then be positioned in place beneath the rim and bolts secured tightly against the brake drum securing the conduit in place as illustrated in FIG. 9. The plurality of knock-out or removable sections 65 of the bracket permit the bracket to be universally adapted to the various bolt circle diameters and bolt spacings on the bolt circle.

The load balancing conduit of the present invention can also be used in connection with spoke vehicle wheels such as bicycle and motorcycle wheels. In this instance, the conduit can be secured in place by a bracket 70 of the type illustrated in FIGS. 11 to 13. Bracket numeral 70 includes a substantially flat body portion 71 having legs 72 and 74 defining intermediate slots 75. Leg 74 has a distal end extending and projecting beyond the terminal end of leg 72. Arm member 78 projects transversely from the end of leg 74 and may be bent downwardly to close slots 75 as seen in FIG. 12. Clip 70 is further formed having a bight portion 78 ending in a U-shape section 80 for partially encircling the outer periphery of tube 22.

As seen in FIG. 13, the clip 70 may be secured adjacent a rim 85 about the end of a spoke 86 at connector 87. The clip is positioned against rim 85 with connector 87 engaged in slot 75. Arm 78 is then bent into a position planar with body portion 74 which prevents the clip from disengaging from the spoke and socket. The clips are suitably placed about the periphery of the rim at selected locations on the spokes and the conduit 22 is secured in place to compensate for a condition of imbalance occurring in the tire or wheel.

It is apparent that the load balancing device of the present invention is simple and is effective to dynamically balance rotating loads in both horizontal and vertical planes. An important advantage of the present invention is that it provides an improved balancing apparatus that may be properly secured into place about the rotating device by the user without any special training, knowledge or complicated tools. The device may be easily adjusted or removed or repaired as required. Further, the load balancing device of the present invention can be readily fabricated at low cost and due to the unique way in which the device is secured, made universal to fit a wide variety of installations.

It will be obvious to those skilled in the art to make various changes, alterations, modifications to the unique load balancing device described herein. To the extent that these changes, alterations and modifications do not depart from the spirit and scope of the appended claims, they are intended to be included therein.

I claim:

1. A load balancing device installable on a rotating rim carried on radial spokes, said load balancing device comprising:

(a) an annular tubular body member defining an annular interior chamber;
(b) a fluid load balancing mass moveable within said chamber in response to centrifugal force to oppose unbalanced forces; and
(c) universal bracket means, said bracket means including an arm portion which at least partially circles said annular tubular body and an attachment portion including a flange defining a slot engageable about selected of said spokes and closure means for securing said spoke in said slot for securing the tubular body to said rotating member.

2. The load balancing device of claim 1 wherein said fluid load balancing mass comprises mercury.

* * * * *